US012101595B2

(12) United States Patent
Zhang et al.

(10) Patent No.: US 12,101,595 B2
(45) Date of Patent: Sep. 24, 2024

(54) LOUDSPEAKER DEVICE

(71) Applicant: SHENZHEN SHOKZ CO., LTD., Guangdong (CN)

(72) Inventors: Lei Zhang, Shenzhen (CN); Yongjian Li, Shenzhen (CN); Wenbing Zhou, Shenzhen (CN); Jinbo Zheng, Shenzhen (CN); Zhuyang Jiang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/631,113

(22) Filed: Apr. 10, 2024

(65) Prior Publication Data

US 2024/0259726 A1 Aug. 1, 2024

Related U.S. Application Data

(63) Continuation of application No. 18/319,468, filed on May 17, 2023, which is a continuation of application
(Continued)

(30) Foreign Application Priority Data

Jan. 5, 2019 (CN) ......................... 201910009909.6

(51) Int. Cl.
*H04R 1/10* (2006.01)
*H04R 1/06* (2006.01)
(Continued)

(52) U.S. Cl.
CPC ............. *H04R 1/1075* (2013.01); *H04R 1/06* (2013.01); *H04R 1/1016* (2013.01); *H04R 1/105* (2013.01);
(Continued)

(58) Field of Classification Search
CPC ...... H04R 1/1075; H04R 1/06; H04R 1/1016; H04R 1/105; H04R 1/1066; H04R 1/1091;
(Continued)

(56) References Cited

U.S. PATENT DOCUMENTS

2009/0185699 A1* 7/2009 Kim ..................... H04R 1/1066
381/151
2011/0317845 A1* 12/2011 Yuan ...................... A61F 11/06
381/73.1
(Continued)

FOREIGN PATENT DOCUMENTS

CN 104581484 A 4/2015
CN 205726269 U 11/2016
(Continued)

OTHER PUBLICATIONS

International Search Report in PCT/CN2019/102388 mailed on Nov. 25, 2019, 7 pages.
(Continued)

*Primary Examiner* — Tuan D Nguyen
(74) *Attorney, Agent, or Firm* — Metis IP LLC

(57) ABSTRACT

A loudspeaker device may include a speaker component, a circuit housing configured to accommodate a control circuit, and a key module disposed on the core housing. The speaker component may include an earphone core and a core housing for accommodating the earphone core. The control circuit may drive the earphone core to vibrate to generate a sound, and the vibration of the earphone core may include at least two resonance peaks. The key module may include a key and an elastic bearing for supporting the key. The elastic bearing may include an integrally formed bearing body and a support column.

20 Claims, 4 Drawing Sheets

Related U.S. Application Data

No. 17/445,602, filed on Aug. 22, 2021, now Pat. No. 11,659,318, which is a continuation of application No. 17/172,096, filed on Feb. 10, 2021, now Pat. No. 11,109,142, which is a continuation of application No. PCT/CN2019/102388, filed on Aug. 24, 2019.

(51) Int. Cl.

| | |
|---|---|
| ***H04R 5/033*** | (2006.01) |
| ***H04R 9/02*** | (2006.01) |
| ***H04R 9/06*** | (2006.01) |

(52) U.S. Cl.

CPC ......... *H04R 1/1066* (2013.01); *H04R 1/1091* (2013.01); *H04R 5/0335* (2013.01); *H04R 9/02* (2013.01); *H04R 9/06* (2013.01); *H04R 1/1041* (2013.01); *H04R 2201/109* (2013.01); *H04R 2420/07* (2013.01); *H04R 2460/13* (2013.01)

(58) Field of Classification Search

CPC .......... H04R 5/0335; H04R 9/02; H04R 9/06; H04R 1/1041; H04R 2201/109; H04R 2420/07; H04R 2460/13; H04R 1/1008

See application file for complete search history.

(56) References Cited

U.S. PATENT DOCUMENTS

| | | | |
|---|---|---|---|
| 2016/0246076 | A1 | 8/2016 | Wei |
| 2017/0006400 | A1 | 1/2017 | Robertson et al. |
| 2017/0087364 | A1 | 3/2017 | Cartledge et al. |
| 2018/0063626 | A1 | 3/2018 | Pong et al. |
| 2021/0076123 | A1 | 3/2021 | Zhang et al. |

FOREIGN PATENT DOCUMENTS

| | | | |
|---|---|---|---|
| CN | 107454492 | A | 12/2017 |
| CN | 107493532 | A | 12/2017 |
| CN | 207070263 | U | 3/2018 |
| CN | 108391213 | A | 8/2018 |
| CN | 108429975 | A | 8/2018 |
| CN | 109495809 | A | 3/2019 |
| JP | 2004229147 | A | 8/2004 |
| KR | 101782435 | B1 | 9/2017 |
| WO | 0137524 | A1 | 5/2001 |

OTHER PUBLICATIONS

Written Opinion in PCT/CN2019/102388 mailed on Nov. 25, 2019, 8 pages.

* cited by examiner

LOUDSPEAKER DEVICE

CROSS-REFERENCE TO RELATED APPLICATIONS

This application is a continuation of U.S. application Ser. No. 18/319,468, filed on May 17, 2023, which is a continuation of U.S. application Ser. No. 17/445,602, filed on Aug. 22, 2021, now U.S. Pat. No. 11,659,318, issued May 23, 2023, which is a continuation of U.S. application Ser. No. 17/172,096, filed on Feb. 10, 2021, now U.S. Pat. No. 11,109,142, issued Aug. 31, 2021, which is a continuation of International Application No. PCT/CN2019/102388, filed on Aug. 24, 2019, which claims priority of Chinese Patent Application No. 201910009909.6, filed on Jan. 5, 2019, the entire contents of each of which are hereby incorporated by reference.

TECHNICAL FIELD

The disclosure generally relates to the field of loudspeaker devices, and more particularly relates to a key module of a loudspeaker device.

BACKGROUND

At present, a speaker component of a loudspeaker device is provided with a key module and an auxiliary key module to facilitate users to perform corresponding functions. Users can realize corresponding functions through the key module and the auxiliary key module, such as pausing/playing music and answering calls. However, the settings of the key module and the auxiliary key module do not consider their impact on the working state of the speaker component. For example, the key module may reduce the volume generated by the speaker component to a certain extent.

SUMMARY

The present disclosure provides a loudspeaker device. The loudspeaker device includes a support connector configured to be in contact with a head and at least one speaker component. The at least one speaker component may include an earphone core and a core housing for accommodating the earphone core. The core housing may be fixedly connected to the support connector. The core housing may be provided with at least one key module. The support connector may accommodate a control circuit or a battery which drive the earphone core to vibrate to produce sound.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
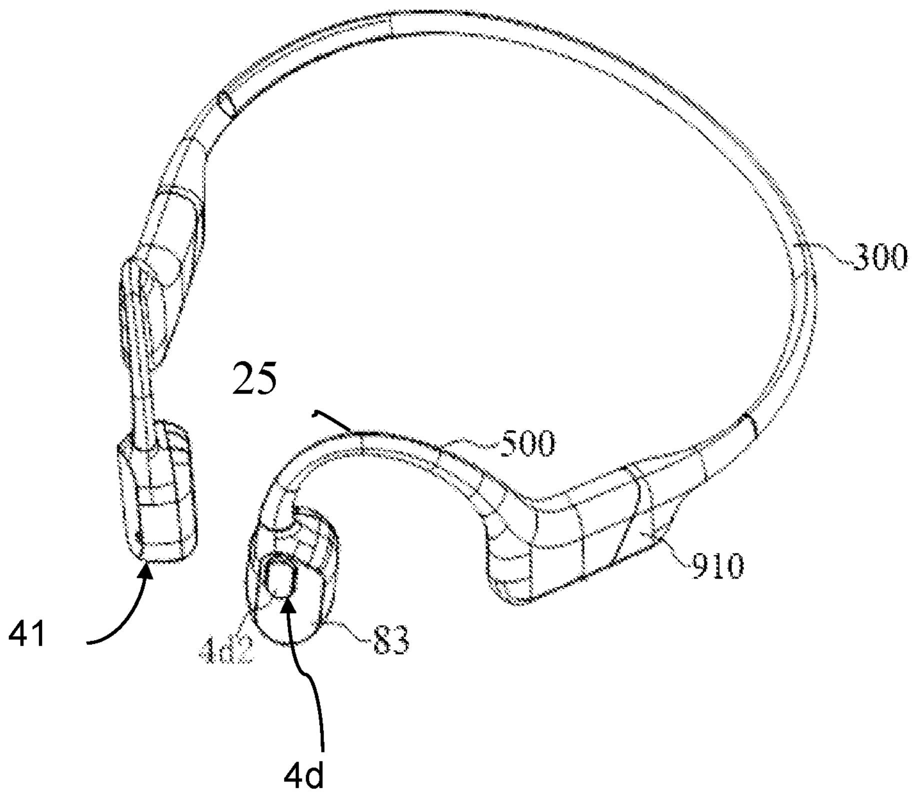
FIG. 1 is a schematic structural diagram illustrating a loudspeaker device according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the" may include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment;" the term "another embodiment" means "at least one other embodiment." Related definitions of other terms will be given in the description below. In the following, without loss of generality, the "loudspeaker device" or "speaker" may be used when illustrating related technologies of conduction in the present disclosure. The illustration is only a form of conductive application. For those skilled in the art, "loudspeaker device" or "speaker" may also be replaced with other similar words, such as "sound producing device," "hearing aid," "sound raising device," or the like. In fact, various implementations in the present disclosure may be easily applied to other hearing devices belonging to non-speaker component. For example, for those skilled in the art, after understanding the basic principles of loudspeaker device, it may be possible to make various modifications and changes in the form and details of the specific methods and operations of implementing loudspeaker device without departing from the principles. In particular, an environmental sound collection and processing function may be added to the loudspeaker device to enable the loudspeaker device to implement the function of a hearing aid. For example, a microphone may collect environmental sounds of a user/wearer, process the sounds using a certain algorithm and transmit the processed sound (or generated electrical signal) to a speaker. That is, the loudspeaker device may be modified to include the function of collecting the environmental sounds, and after a certain signal processing, the sound may be transmitted to the user/wearer via the speaker module. As an example, the algorithm mentioned herein may include noise cancellation, automatic gain control, acoustic feedback suppression, wide dynamic range compression, active environment recognition, active noise reduction, directional processing, tinnitus processing, multi-channel wide dynamic range compression, active howling suppression, volume control, or the like, or any combination thereof.

Figure 2:
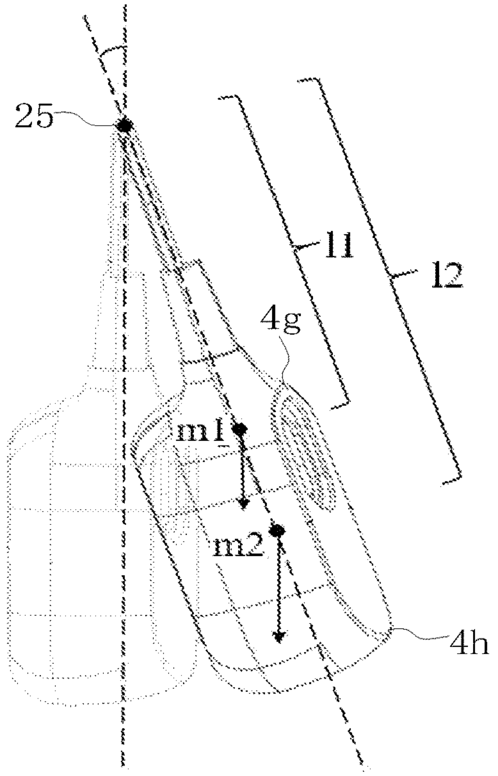
FIG. 2 is a schematic structural diagram illustrating a speaker component according to some embodiments of the present disclosure.

FIG. 1 is a schematic structural diagram illustrating a loudspeaker device according to some embodiments of the present disclosure. FIG. 2 is a schematic structural diagram illustrating a speaker component according to some embodiments of the present disclosure. The loudspeaker device may transmit a sound to an auditory system of a user of the loudspeaker device via a bone conduction mode and/or an air conduction mode, so that the user can hear the sound. In some embodiments, the loudspeaker device may include a support connector 910 and at least one speaker component 83 disposed on the support connector 910. In some embodiments, the support connector 910 may include an ear hook 500. Specifically, the support connector 910 may include two ear hooks 500 and a rear hook 300, and the rear hook 300 may be connected to the two ear hooks 500 and disposed between the two ear hooks 500. When the loudspeaker device is worn by the user, the two ear hooks 500 may correspond to the left ear and the right ear of the user, respectively, and the rear hook 300 may correspond to the back of the head of the user. The ear hook 500 may be configured to contact with the head of the user, and one or more contact points (i.e., one or more points located near a top end 25) of the ear hook 500 and the head of the user may include a vibration fulcrum of the speaker component 83 when the speaker component 83 vibrates.

In some embodiments, the vibration of the speaker component 83 may be regarded as a reciprocating swing movement. The top end 25 of the ear hook 500 (also referred to as the top end 25 for brevity) may be regarded as a fixed point of the reciprocating swing movement, and a portion of the ear hook 500 between the top end 25 and the speaker component 83 may be regarded as an arm of the reciprocating swing movement. The fixed point of the reciprocating swing movement may be regarded as the vibration fulcrum. A swing amplitude (i.e., vibration acceleration) of the speaker component 83 may be a positive correlation with a volume generated by the speaker component 83. A mass distribution of the speaker component 83 may affect the amplitude of the swing amplitude of the speaker component 83, and further affect the volume generated by the speaker component 83.

In some embodiments, the speaker component 83 may include an earphone core (not shown), a core housing 41 configured to accommodate the earphone core, a speaker module (not shown in the figure), and at least one key module **4*d*. Specifically, the key module 4*d* may include a button block 4*d*2. The speaker module may include a first speaker module and a second speaker module, which may be disposed in the left and right speaker components 83, respectively. In some embodiments, the speaker module may refer to all components of the speaker component 83 other than the key module 4*d*. For example, the speaker module may refer to the earphone core and the core housing 41**.

Further, the support connector 910 may be configured to accommodate a control circuit (not shown in the figure) or a battery (not shown in the figure). The control circuit or the battery may drive the earphone core to vibrate to generate a sound.

In some embodiments, the key module **4*d* may be configured for user operation. For example, a user may operate the key module 4*d*** to perform a function such as a pause/start function, a recording function, an answering a call function, or the like.

Specifically, the key module **4*d* may implement different interactive functions based on a user's operation instruction. For example, the user may click the key module 4*d* once to pause/start e.g., music, recording, etc. As another example, the user may click the key module 4*d* twice to answer a call. As a further example, the user may regularly click the key module 4*d* (e.g., click the key module 4*d* once every second, click the key module 4*d* twice in total) to activate a recording function of the loudspeaker device. In some embodiments, the user's operation instruction may include a click, a slid, a scroll, or the like, or any combination thereof. For example, the user may slide up and down on a surface of the key module 4*d*** to realize a function of switching songs.

In an application scenario, the speaker component 83 may include at least two key modules **4*d*, and the at least two key modules 4*d* may correspond to a left ear hook and a right car hook, respectively. The user may use the left and right hands to operate the at least two key modules 4*d***, respectively, thereby improving the user's experience.

In some embodiments, to further improve the user's human-computer interaction experience, the human-computer interaction function may be allocated to the key modules **4*d* corresponding to the left ear hook and the right ear hook, respectively. The user may operate each of the at least two key modules 4*d* to realize corresponding functions. For example, the user may click the key module 4*d* corresponding to the left ear hook once to activate a recording function, and/or click the key module 4*d* corresponding to the left ear hook again to turn off the recording function. As another example, the user may click the key module 4*d* corresponding to the left ear hook twice to realize the pause/play function. As another example, the user may click the key module 4*d*** corresponding to the right ear hook twice to answer a call or realize a next/previous song function when music is playing and there is no call.

In some embodiments, the aforementioned functions corresponding to the at least two key modules **4*d* may be determined by the user. For example, the user may assign the pause/play function executed by the key module 4*d* corresponding to the left ear hook to the key module 4*d* corresponding to the right ear hook by setting an application software. As another example, the user may determine that the function of answering a call function executed by performing an operation on the key module 4*d* corresponding to the left ear hook may be replaced by performing an operation on the key module 4*d* corresponding to the right ear hook. Further, for a specific function, the user may determine the user's operation instruction (e.g., a number of clicking the key module 4*d*, a sliding gesture, etc.) by setting the application software to perform the function. For example, a user's operation instruction corresponding to the answering a call function may be determined as click the key module 4*d* twice instead of once. As another example, a user's operation instruction corresponding to the next/previous song function may be determined as click the key module 4*d*** three times instead of twice. The user may determine the user's operation instruction based on a habit of the user, thereby to a certain extent, avoiding operational errors and improving the user experience.

In some embodiments, the above-mentioned interaction function may be not unique, which may be determined according to functions commonly used by the user. For example, the key module **4*d*** may be used to perform a call rejection function, a text messages read function, or the like. The user may determine the interaction function and/or the user's operation instruction, thereby meeting different needs.

In some embodiments, a distance between a center of the key module **4*d* and the vibration fulcrum may be not greater than a distance between a center of the speaker module and the vibration fulcrum, thereby improving the vibration acceleration of the speaker component 83 and the volume generated by the vibration of the speaker component 83**.

In some embodiments, the center of the key module **4*d* may include a center of mass m1 or a centroid g1. A first distance 11 may be formed between the center of mass m1 or the centroid g1 of the key module 4*d* and the top end 25 (i.e., the vibration fulcrum). A second distance 12 may be formed between a center of mass m2 or a centroid g2 of the speaker module (the portion of the speaker component 83 other than the key module 4*d*) and the top end 25. It should be noted that the center of mass and the centroid of the speaker module may be replaced by a center of mass and a centroid of the core housing 41**, respectively.

In some embodiments, a mass distribution of the key module **4*d* and/or the speaker module may be relatively uniform. The center of mass m1 of the key module 4*d* may coincide with the centroid g2 of the key module 4*d*. The center of mass m2 of the speaker module may coincide with the centroid g2** of the speaker module.

In some embodiments, the mass distribution of the key module **4*d* in the speaker component 83 may be indicated by a ratio of the first distance 11 to the second distance 12, and a ratio k of a mass of the key module 4*d*** to a mass of the speaker module.

Specifically, according to the dynamic principle, when the key module **4*d* is arranged at a far end 4*h* of the top end 25, a vibration acceleration of the speaker component 83 may be less than a vibration acceleration of the speaker component 83 when the key module 4*d* is arranged at a proximal end 4*g* of the top end 25, thereby reducing the volume generated by the speaker component 83. When the mass of the key module 4*d* is constant, the vibration acceleration of the speaker component 83 may be decreased as the ratio of the first distance 11 to the second distance 12 increases, thereby reducing the volume generated by the speaker component 83. When the ratio of the first distance 11 to the second distance 12 is constant, the vibration acceleration of the speaker component 83 may be decreased as the mass of the key module 4*d* increases, thereby reducing the volume generated by the speaker component 83. The volume generated by the speaker component 83 may be determined and/or adjusted within a range that the ear of the user can recognize by adjusting the ratio of the first distance 11 to the second distance 12 and/or the mass ratio k of the key module 4*d*** to the mass of the speaker module.

In some embodiments, the ratio of the first distance 11 to the second distance 12 may not be greater than 1.

Specifically, when the ratio of the first distance 11 to the second distance 12 is equal to 1, the center of mass m1 and centroid g1 of the key module **4*d* may coincide with the center of the mass m2 and the centroid g2 of the speaker module, respectively, and the key module 4*d* may be disposed on a center of the speaker component 83. When the ratio of the first distance 11 to the second distance 12 is less than 1, the center of mass m1 or the centroid g1 of the key module 4*d* may be closer to the top end 25 with respect to the center of mass m2 or the centroid g2 of the speaker module, and the key module 4*d* may be disposed on a proximal end close to the top end 25. The smaller the ratio of the first distance 11 to the second distance 12 is, the closer the center of mass m1 or centroid g1 of the key module 4*d* to the top end 25 relative to the center of mass m2 or centroid g2** of the speaker module is.

In some embodiments, the ratio of the first distance 11 to the second distance 12 may be not greater than 0.95, and the key module **4*d* may be closer to the top end 25. In some embodiments, the ratio of the first distance 11 to the second distance 12** may be 0.9, 0.8, 0.7, 0.6, 0.5, etc., which may be determined according to actual needs and is not limited herein.

Further, when the ratio of the first distance 11 to the second distance 12 satisfies a range aforementioned, the ratio of the mass of the key module **4*d* to the mass of the speaker module may not be greater than 0.3. For example, the ratio of the mass of the key module 4*d*** to the mass of the speaker module may not be greater than 0.29, 0.23, 0.17, 0.1, 0.06, 0.04, etc., which are not limited herein.

It should be noted that the center of mass m1 of the key module **4*d* may coincide with the centroid g1 of the key module 4*d* (not shown in the figure), that is, the center of mass m1 of the key module 4*d* and the centroid g1 of the key module 4*d* may locate at a same point. When the mass distribution of the key module 4*d* and the speaker module is relatively uniform, the center of mass m2 of the speaker module may coincide with the centroid g2** (not shown in the figure) of the speaker module.

In some embodiments, the center of mass m1 may not coincide with the centroid g1 of the key module **4*d*. Specifically, since the structure of the key module 4*d* is relatively simple and/or regular, the centroid g1 of the key module 4*d* may be calculated relatively easily, the centroid g1 may be regarded as a reference point. The center of mass m2 of the speaker module may not coincide with the centroid g2 of the speaker module. Since one or more units (e.g., a microphone, a flexible circuit board, a bonding pad, etc.) of the speaker module may be made of different materials, the mass distribution of the speaker module may be not uniform, and the one or more units may have an irregular shape. Thus, the center of mass m2** of the speaker module may be regarded as a reference point.

In an application scenario, the first distance 11 may be formed between the centroid g1 of the key module **4*d* and the top end 25, and the second distance 12 may be formed between the center of mass m2 of the speaker module and the top end 25. The mass distribution of the key module 4*d* in the speaker component 83 may be indicated by the ratio of the first distance 11 to the second distance 12, and the mass ratio k of a mass of the key module 4*d* to the mass of the speaker module. Specifically, when the mass of the key module 4*d* is constant, the vibration acceleration of the speaker component 83 may be decreased as the ratio of the first distance 11 to the second distance 12 increases, thereby reducing the volume generated by the speaker component 83. When the ratio of the first distance 11 to the second distance 12 is constant, the vibration acceleration of the speaker component 83 may be decreased as the mass of the key module 4*d* increases, thereby reducing the volume generated by the speaker component 83. Therefore, the volume generated by the speaker component 83 may be determined and/or adjusted within a range that the ear can recognize by adjusting the ratio of the first distance 11 to the second distance 12 and/or the mass ratio k of the key module 4***d* to the mass of the speaker module.

In an embodiment, the ratio of the first distance 11 to the second distance 12 may not be greater than 1.

Specifically, when the ratio of the first distance 11 to the second distance 12 is equal to 1, the centroid g1 of the key module 4*d* may coincide with the center of mass the m2 of the speaker module. Therefore, the key module 4*d* may be disposed on a center of the speaker component 83. When the ratio of the first distance 11 to the second distance 12 is less than 1, the centroid g1 of the key module 4*d* may be closer to the top end 25 with respect to the center of the mass m2 of the speaker module. Therefore, the key module 4*d* may be disposed on the proximal end close to the top end 25. The smaller the ratio of the first distance 11 to the second distance 12 is, the closer the centroid g1 of the key module 4*d* to the top end 25 relative to the center of mass m2 of the speaker module.

Further, the ratio of the first distance 11 to the second distance 12 may be not greater than 0.95. Therefore, the key module 4*d* may be closer to the top end 25. As used herein, the ratio of the first distance 11 to the second distance 12 may be 0.9, 0.8, 0.7, 0.6, 0.5, etc., which may be determined according to actual needs and is not limited herein.

Further, when the ratio of the first distance 11 to the second distance 12 satisfies a range aforementioned, the ratio of the mass of the key module 4*d* to the mass of the speaker module may not be greater than 0.3. For example, the ratio of the mass of the key module 4*d* to the mass of the speaker module may not be greater than 0.29, 0.23, 0.17, 0.1, 0.06, 0.04, etc., which are not limited herein.

It should be noted that, in some embodiments, the centroid g2 of the speaker module may be regarded as the reference point, which may be similar to the foregoing mentioned embodiments, which is not be repeated herein.

Figure 3:
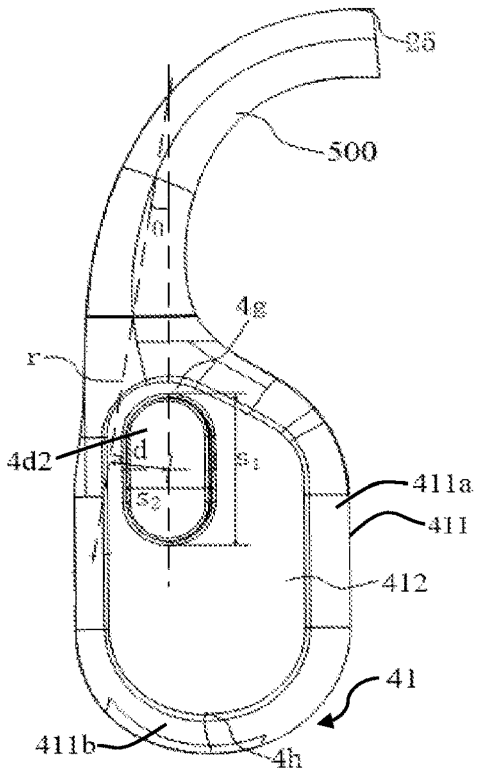
FIG. 3 is a schematic structural diagram illustrating a speaker component of a loudspeaker device according to some embodiments of the present disclosure.

FIG. 3 is a schematic structural diagram illustrating a speaker component of a loudspeaker device according to some embodiments of the present disclosure. In some embodiments, a speaker module may include an earphone core and a core housing 41. The earphone core may be configured to generate a sound and the core housing 41 may be configured to accommodate the earphone core.

In some embodiments, the core housing 41 may include an outer side wall 412 and a peripheral side wall 411. The peripheral side wall 411 may be connected to and surrounding the outer side wall 412. When a user wears the loudspeaker device, one side of the peripheral side wall 411 may be in contact with the human head, and the outer side wall 412 may be located at the side of the peripheral side wall 411 away from the human head. In some embodiments, the core housing 41 may include a cavity configured to accommodate the earphone core.

In some embodiments, the peripheral side wall 411 may include a first peripheral side wall 411*a* arranged along a length direction of the outer side wall 412 and a second peripheral side wall 411*b* arranged along a width direction of the outer side wall 412. The outer side wall 412 and the peripheral side wall 411 may be connected and form the cavity with an open end, and the cavity may be configured to accommodate the earphone core.

In some embodiments, a count (or a number) of the first peripheral side wall 411*a* and/or the second peripheral side wall 411*b* may be two. The first peripheral side wall 411*a* and the second peripheral side wall 411*b* may be enclosed in sequence. When the user wears the loudspeaker device, the two first peripheral side walls 411*a* may face a front side and a back side of the user's head, respectively. The two second peripheral side walls 411*b* may face an upper side and a lower side of the user's head, respectively.

In some embodiments, the outer side wall 412 may cover an end of the first peripheral side wall 411*a* and the second peripheral side wall 411*b* after the first peripheral side wall 411*a* and the second peripheral side wall 411*b* are enclosed. The core housing 41 with an open end and a closed end may be formed and configured to accommodate the earphone core.

In some embodiments, a shape enclosed by the first peripheral side wall 411*a* and the second peripheral side wall 411*b* may be not limited. The shape enclosed by the first peripheral side wall 411*a* and the second peripheral side wall 411*b* may include any shape suitable for wearing on the user's head, such as a rectangle, a square, a circle, an ellipse, etc.

In some embodiments, the shape enclosed by the first peripheral side wall 411*a* and the second peripheral side wall 411*b* may conform to the principle of ergonomics, thereby improving the wearing experience of the user. In some embodiments, a height of the first peripheral side wall 411*a* and a height of the second peripheral side wall 411*b* may be the same or different. When heights of two successively connected peripheral side walls 411 are different, a protruding part of the peripheral side wall 411 may not affect the wearing and/or operation of the user.

Figure 4:
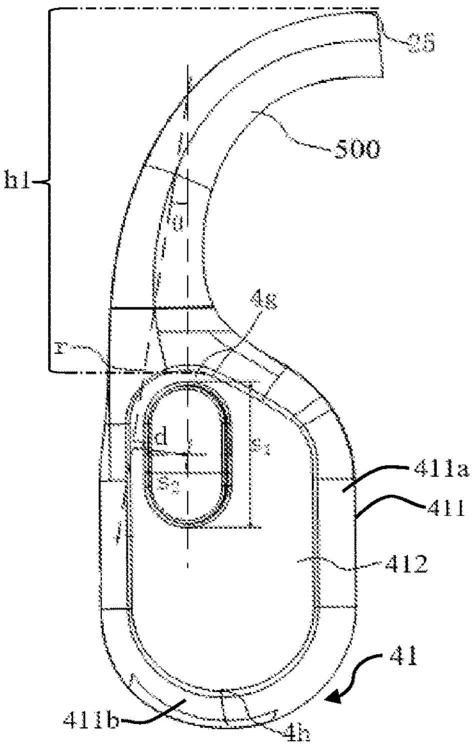
FIG. 4 is a schematic diagram illustrating a distance h1 according to some embodiments of the present disclosure.
Figure 5:
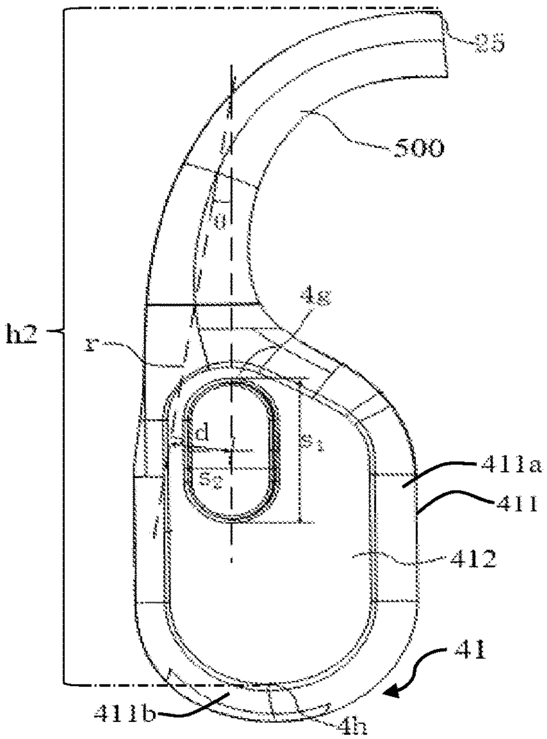
FIG. 5 is a schematic diagram illustrating a distance h2 according to some embodiments of the present disclosure.
Figure 6:
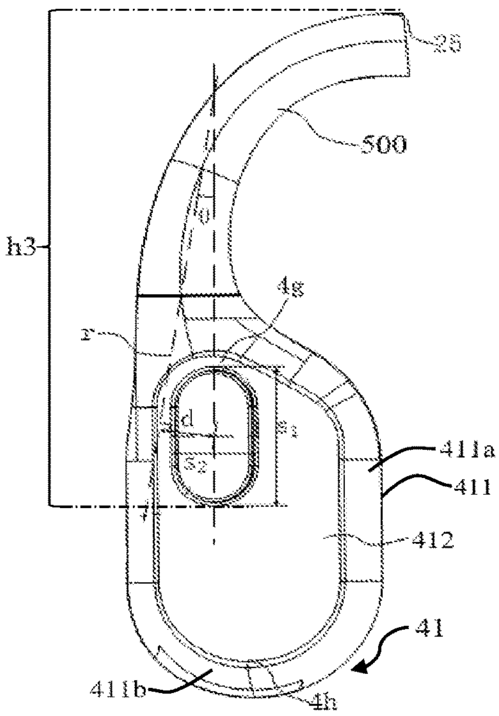
FIG. 6 is a schematic diagram illustrating a distance h3 according to some embodiments of the present disclosure.

FIG. 4 is a schematic diagram illustrating a distance h1 according to some embodiments of the present disclosure. FIG. 5 is a schematic diagram illustrating a distance h2 according to some embodiments of the present disclosure. FIG. 6 is a schematic diagram illustrating a distance h3 according to some embodiments of the present disclosure. In some embodiments, an outer side wall 412 may be disposed on an end enclosed by a first peripheral side wall 411*a* and a second peripheral side wall 411*b*. When a user wears a loudspeaker device, the outer side wall 412 may be located at an end of the first peripheral side wall 411*a* and the second peripheral side wall 411*b* away from the user's head. In some embodiments, the outer side wall 412 may include a proximal end point and a distal end point. The proximal end point and the distal end point may be located on a contour connecting the outer side wall 412 with the first peripheral side wall 411*a* and the second peripheral side wall 411*b*, respectively. The proximal end point may be opposite to the distal end point on the contour. In some embodiments, the distance h1 between the proximal end point and a vibration fulcrum may be relatively short, and the proximal end may be referred to as at a top position. The distance h2 between the distal end point and the vibration fulcrum may be relatively long, and the distal end point may be referred to as at a bottom position. The distance h3 between a midpoint of a line connecting the proximal end point and the distal end point and the vibration fulcrum may be between h1 and h2, and the midpoint may be referred to as at a middle position.

In some embodiments, the key module 4*d* may be located in the middle position of the outer side wall 412. In some embodiments, the key module 4*d* may be located between the middle position and the top position of the outer side wall 412.

Figure 7:
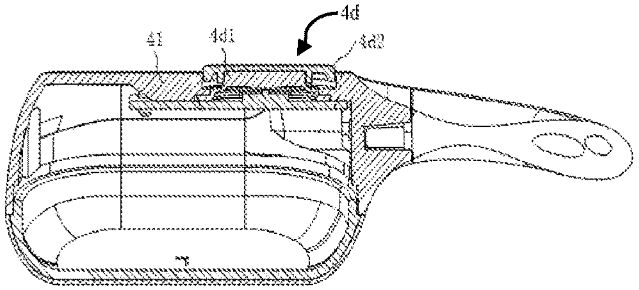
FIG. 7 is a schematic diagram illustrating a cross-sectional view of a partial structure of a speaker component according to some embodiments of the present disclosure.

FIG. 7 is a schematic diagram illustrating a cross-sectional view of a partial structure of a speaker component according to some embodiments of the present disclosure. As shown in FIG. 7, a key module 4*d* may further include an elastic bearing 4*d*1 and a button block 4*d*2.

In some embodiments, a shape of the button block 4*d*2 may be a rectangle with rounded corners, and the button block 4*d*2 may extend along a length direction of the outer side wall 412. The button block 4*d*2 may include two symmetry axes (e.g., a long axis and a short axis), and the button block 4*d*2 may be arranged symmetrically in two symmetry directions, and the symmetry directions are perpendicular to each other.

Figure 8:
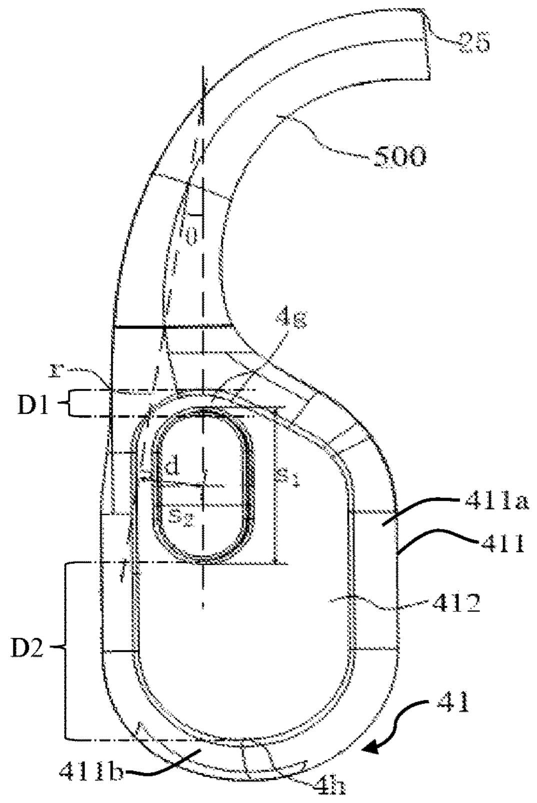
FIG. 8 is a schematic diagram illustrating a distance D1 and a distance D2 according to some embodiments the present disclosure.

FIG. 8 is a schematic diagram illustrating a distance D1 and a distance D2 according to some embodiments the present disclosure. As shown in FIG. 8, a distance between the top of the button 4*g* and a top end position of an outer side wall 412 is the first distance D1. A distance between the bottom of the button 4*g* and a bottom end position of the outer side wall 412 is the second distance D2. A ratio of the first distance D1 to the second distance D2 may not be greater than 1.

Specifically, when the ratio of the distance D1 to the distance D2 is equal to 1, the button 4*g* may be located in a middle position of the outer side wall 412. When the ratio of the first distance D1 and the second distance D2 is less than 1, the button 4*g* may be located between the middle position and the top end position of the outer side wall 412.

Further, the ratio of the first distance D1 to the second distance D2 may be not greater than 0.95. Therefore, the button block 4*d*2 may be close to the top end position of the outer wall 412, that is, the button block 4*d*2 may be close to the vibration fulcrum, thereby improving a volume of a speaker component 83. In some embodiments, the ratio of the first distance D1 to the second distance D2 may be 0.9, 0.8, 0.7, 0.6, 0.5, etc., which may be determined according to different needs and is not limited herein.

In some embodiments, a connection portion connecting the ear hook 500 and the speaker module may have a central axis. In some embodiments, the connection portion connecting the ear hook 500 and the speaker module may include an outer surface. In some embodiments, the outer surface of the button block 4*d*2 may be a side surface of the button block 4*d*2 away from the user's head when the user wears the loudspeaker device. In some embodiments, an extension line r of the central axis may have a projection on a plane where the outer surface of the button block locates. An angle θ formed between the projection and the long axis direction of the button block 4*d*2 may be less than 10°, for example, 9°, 7°, 5°, 3°, 1°, etc., which is not limited herein.

When the angle θ formed between the projection of the extension line r on the plane where the outer surface of the button block 4*d*2 locates and the long axis direction is less than 10°, a deviation of the long axis direction of the button block 4*d*2 from the extension line r may be relatively small. Therefore, the long axis direction of the button block 4*d*2 may be regarded as consistent or substantially consistent with the direction of the extension line r of the central axis.

In some embodiments, an extension line r of the central axis may have a projection on a plane where the outer surface of the button block 4*d*2 locates. In some embodiments, the long axis direction of the outer surface of the button block 4*d*2 and the short axis direction of the outer surface of the button block 4*d*2 may have an intersection. A distance d between the projection and the intersection may be relatively small. The distance d may be less than a width $S_2$ of the outer surface along the short axis direction of the button block 4*d*2, thereby making the button block 4*d*2 close to the extension line r of the central axis of the ear hook 500. In some embodiments, the projection of the extension line r of the central axis of the ear hook 500 on the plane where the outer surface of the button block 4*d*2 locates may coincide with the long axis direction of the button block 4*d*2, thereby further improving the sound quality of the speaker component 83.

In some embodiments, a long axis of the button block 4*d*2 may be in a direction from the top of the button block 4*d*2 to the bottom of the button block 4*d*2, or a direction in which the car hook 500 may be connected to the core housing 41. The short axis of the button block 4*d*2 may be perpendicular to the long axis of the button block 4*d*2 and pass through a midpoint of a line connecting the top of the button block 4*d*2 and the bottom of the button block 4*d*2. A size of the button block 4*d*2 along the long axis direction may be $s_1$, and a size of the button block 4*d*2 along a circumferential direction may be $s_2$.

In some embodiments, the first peripheral side wall 411*a* may have a bottom end position, a middle position, and a top end position along the direction close to the vibration fulcrum.

The bottom end position of the first peripheral side wall 411*a* may include a connection point connecting the first peripheral side wall 411*a* and the second peripheral side wall 411*b* which is away from the ear hook 500. The top end position may include a connection point connecting the first peripheral side wall 411*a* and the second peripheral side wall 411*b* which is close to the ear hook 500. The middle position may include a midpoint of a line connecting the bottom end position and the top end position of the first peripheral side wall 411*a*.

In some embodiments, the key module 4*d* may be disposed on the middle position of the first peripheral side wall 411*a* (not shown in the figure), or between the middle position and the top end position of the first peripheral side wall 411*b* (not shown in the figure). The key module 4*d* may be centrally disposed on the first peripheral side wall 411*a* along a width direction of the first peripheral side wall 411*a*.

Figure 9:
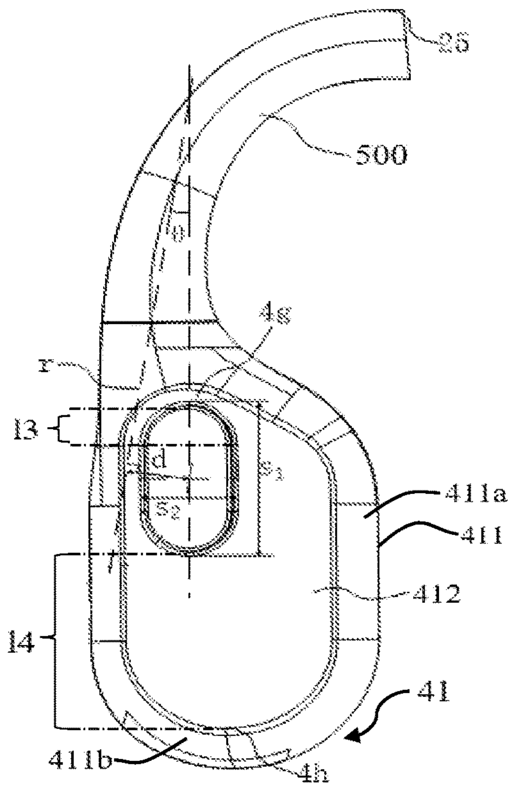
FIG. 9 is a schematic diagram illustrating a distances 13 and a distance 14 according to some embodiments of the present disclosure.

FIG. 9 is a schematic diagram illustrating a distance 13 and a distance 14 according to some embodiments of the present disclosure. In some embodiments, the third distance 13 refers to a distance between a top of a key module 4*d* and a top end position of a first peripheral side wall 411*a*. The fourth distance 14 refers to a distance between a bottom of the key module 4*d* and a bottom end position of the first peripheral side wall 411. A ratio of the third distance 13 to the fourth distance 14 may be not greater than one.

Further, the ratio of the third distance 13 to the fourth distance 14 may be not greater than 0.95, so that the key module 4*d* may be relatively close to the top end position of the first peripheral side wall 411*a*, that is, the key module 4*d* may be relatively close to the vibration fulcrum, thereby improving the volume generated by a speaker component 83. The ratio of the third distance 13 to the fourth distance 14 may also be 0.9, 0.8, 0.7, 0.6, 0.5, etc., which may be determined according to the actual need and not limited herein.

In some embodiments, as mentioned above, the third distance D3 may be formed between a top of a button block 4*d*2 and a top end position of a first peripheral side wall 411*a*. The fourth distance D4 may be formed between a bottom of the button block 4*d*2 and a bottom end position of the first peripheral side wall 411. A ratio of the third distance D3 to the fourth distance D4 may be not greater than one.

Further, the ratio of the third distance D3 to the fourth distance D4 may be not greater than 0.95. Therefore, the button block 4*d*2 may be close to the top end position of the first peripheral side wall 411*a*, that is, the button block 4*d*2 may be close to the vibration fulcrum, thereby improving a volume of a speaker component 83. In some embodiments, the ratio of the third distance D3 to the fourth distance D4 may be 0.9, 0.8, 0.7, 0.6, 0.5, etc., which may be determined according to different needs and is not limited herein.

What is claimed is:

1. A loudspeaker device, comprising:
a support connector configured to be in contact with a head, the support connector including an ear hook; and
at least one speaker component, the at least one speaker component including an earphone core and a core housing for accommodating the earphone core, the core housing being fixedly connected to the support connector, the core housing being provided with a key module; wherein
when the loudspeaker device is in a wearing state, a distance between a center of the key module and a top end of the ear hook is not greater than a distance between a center of the core housing and the top end of the ear hook.

2. The loudspeaker device of claim 1, wherein
the top end of the ear hook is a vibration fulcrum of a reciprocating swing movement of the at least one speaker component when the at least one speaker component vibrates, and
a portion of the ear hook between the top end of the ear hook and the at least one speaker component is an arm of the reciprocating swing movement.

3. The loudspeaker device of claim 2, wherein the core housing includes an outer side wall away from the head and a peripheral side wall connected to and surrounding the outer side wall.

4. The loudspeaker device of claim 3, wherein:
the peripheral side wall includes a first peripheral side wall disposed along a length direction of the outer side wall and a second peripheral side wall disposed along a width direction of the outer side wall; and
the outer side wall and the peripheral side wall are connected together to form a cavity with an open end and accommodating the earphone core.

5. The loudspeaker device of claim 4, wherein the key module is located at a middle position of the outer side wall, or the key module is located between the middle position and a top position of the outer side wall.

6. The loudspeaker device of claim 4, wherein
there is a third distance between a top of the key module and a top end position of the first peripheral side wall,
there is a fourth distance between a bottom of the key module and a bottom end position of the first peripheral side wall,
wherein a ratio of the third distance to the fourth distance is not greater than 1.

7. The loudspeaker device of claim 6, wherein
the ratio of the third distance to the fourth distance is not greater than 0.95.

8. The loudspeaker device of claim 7, wherein
the ratio of the third distance to the fourth distance is not greater than 0.7.

9. The loudspeaker device of claim 3, wherein
there is a first distance between a top of the key module and a top end position of the outer side wall;
there is a second distance between a bottom of the key module and a bottom end position of the outer side wall;
a ratio of the first distance to the second distance is not greater than 1.

10. The loudspeaker device of claim 9, wherein the ratio of the first distance to the second distance is not greater than 0.95.

11. The loudspeaker device of claim 10, wherein the ratio of the first distance to the second distance is not greater than 0.7.

12. The loudspeaker device of claim 3, wherein
the key module includes a key and an elastic bearing for supporting the key, and
the outer side wall is provided with a key hole matching the key.

13. The loudspeaker device of claim 1, wherein the center of the key module or the center of the core housing is a center of mass or a centroid.

14. The loudspeaker device of claim 1, wherein a connection portion connecting the ear hook and the core housing includes a central axis, an extension line of the central axis having a projection on a plane where an outer side surface of the key module is located, an angle between the projection and a long axis direction of the key module being less than 10°.

15. The loudspeaker device of claim 14, wherein the angle between the projection and the long axis direction of the key module being less than 7°.

16. The loudspeaker device of claim 14, wherein the projection of the extension line of the central axis of the ear hook on the plane where the outer side surface of the key module locates coincides with the long axis direction of the key module.

17. The loudspeaker device of claim 14, wherein there is an intersection between the long axis direction and a short axis direction of the outer side surface of the key module, there being a shortest distance between the projection and the intersection, the shortest distance being smaller than a size of the outer side surface of the key module in the short axis direction.

18. The loudspeaker device of claim 1, wherein
there is a first distance between the center of the key module and the top end of the ear hook,
there is a second distance between the center of the core housing and the top end of the ear hook, and
a ratio between the first distance and the second distance is not greater than 0.95.

19. The loudspeaker device of claim 18, wherein the ratio between the first distance and the second distance is not greater than 0.90.

20. The loudspeaker device of claim 1, wherein a ratio of a mass of the key module and a mass of the speaker component is not greater than 0.3.

* * * * *